(12) United States Patent
Tang et al.

(10) Patent No.: US 10,978,980 B2
(45) Date of Patent: Apr. 13, 2021

(54) SWITCHED RELUCTANCE MOTOR CONTROL

(71) Applicant: KARMA AUTOMOTIVE LLC, Irvine, CA (US)

(72) Inventors: Lixin Tang, Irvine, CA (US); Geng Niu, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 16/505,547

(22) Filed: Jul. 8, 2019

(65) Prior Publication Data

US 2021/0013822 A1  Jan. 14, 2021

(51) Int. Cl.
| | |
|---|---|
| *H02P 25/092* | (2016.01) |
| *B60L 50/51* | (2019.01) |
| *H02K 1/24* | (2006.01) |
| *H02P 27/06* | (2006.01) |
| *H02P 25/18* | (2006.01) |

(52) U.S. Cl.
CPC ............ *H02P 25/092* (2016.02); *B60L 50/51* (2019.02); *H02K 1/246* (2013.01); *H02P 25/182* (2013.01); *H02P 27/06* (2013.01)

(58) Field of Classification Search
CPC .. B60L 2220/18; B60L 50/51; B60L 2220/46; H02P 25/08; H02P 25/092; H02P 25/16; H02P 6/28; H02P 6/04; H02P 25/18; H02K 1/246; H02K 3/28
See application file for complete search history.

(56) References Cited

U.S. PATENT DOCUMENTS

| | | | |
|---|---|---|---|
| 4,707,650 A | 11/1987 | Bose | |
| 4,772,839 A | 9/1988 | MacMinn et al. | |
| 4,896,089 A | 1/1990 | Kliman et al. | |
| 5,111,095 A | 5/1992 | Hendershot | |
| 5,545,938 A * | 8/1996 | Mecrow | H02K 3/18 310/156.64 |
| 6,246,193 B1 * | 6/2001 | Dister | H02P 6/185 318/254.2 |
| 7,271,556 B2 | 9/2007 | Kishibe et al. | |
| 8,006,789 B2 | 8/2011 | Dial | |
| 8,125,170 B2 * | 2/2012 | Fahimi | H02P 25/089 318/400.35 |
| 8,138,701 B2 * | 3/2012 | Knezevic | H02K 23/66 318/400.32 |
| 8,220,575 B2 | 7/2012 | Dial | |
| 8,228,013 B2 * | 7/2012 | Liu | H02P 21/14 318/400.33 |
| 8,544,580 B2 | 10/2013 | Cheng et al. | |
| 8,618,758 B2 * | 12/2013 | Bouchez | H02P 6/182 318/400.35 |
| 8,716,961 B2 | 5/2014 | Ramu | |
| 10,075,050 B2 * | 9/2018 | Perry | H02K 19/103 |

(Continued)

*Primary Examiner* — Thai T Dinh
(74) *Attorney, Agent, or Firm* — Gordon Rees Scully Mansukhani, LLP

(57) ABSTRACT

A switched reluctance motor for an electric vehicle. The switched reluctance motor includes an inverter with switchable windings to control the inductance of the motor. The motor also includes a high speed and low speed mode corresponding to the inductance of the motor. The inverter may include parallel switches, selectively running current to the windings in order to control the inductance.

16 Claims, 6 Drawing Sheets

(56) References Cited

U.S. PATENT DOCUMENTS

| | | | |
|---|---|---|---|
| 2004/0217668 A1* | 11/2004 | Antonopoulos | H02K 19/103 310/168 |
| 2008/0272719 A1* | 11/2008 | Adra | H02K 11/21 318/254.1 |
| 2018/0006592 A1* | 1/2018 | Faid | H02P 25/188 |
| 2018/0102722 A1* | 4/2018 | Deguchi | H02K 1/246 |

* cited by examiner

SWITCHED RELUCTANCE MOTOR CONTROL

The present disclosure related generally to the field of drive systems for an electric vehicle. Specifically, a switched reluctance motor (SRM) drive system for an electric vehicle.

In a SRM drive system, the high speed limit for the motor is determined by multiple factors, such as dc bus voltage, motor characteristics and control strategy. Normally, providing the motor with a wider speed range is desirable. For electric vehicle applications, it may be desirable to provide the motor with a higher top speed and/or higher torque.

Current electric vehicles operate with SRMs due to their simple, low cost, high efficiency and robustness. The power is delivered to the windings in the stator rather than the rotor. SRMs are capable of producing high torque at low speeds, making them favorable for propulsive motors in electric vehicles. The torque produced by the SRM is due to its tendency of its rotor to move to a position where the inductance of the excited windings is maximized. By turning the current on at the phases in a predetermined sequence, the stator poles attract the rotor poles in a cyclical manner. The current is switched off in windings immediately before the attracted rotor poles rotate past the corresponding rotor. The current switching sequence allows the motor to produce torque. The SRM allows great advantages of inherent fault tolerance and high reliability due to independent circuits for each phase of the SRM. In current SRM drive systems, the high speed limit is determined by multiple factors, such as DC-BUS voltage, motor characteristics, and motor control profiles. It is desired to include a motor with a wide speed range. Specifically, a higher top speed and/or torque is desired for electric vehicle applications.

Accordingly, an object of the present disclosure is to provide a new and inventive circuit for the windings of the motor to allow higher speeds and/or torque.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

As disclosed herein, a switchable winding for a propulsion motor for an electric vehicle is provided. Specifically, the propulsion motor is a SRM. The inverter circuit for a phase of an SRM includes diametrically opposite windings which are selectively switched on (i.e., carrying current), allowing the rotor to rotate towards a minimum reluctance configuration. A DC power source is provided to supply power to the motor via the windings. The DC power source in an electric vehicle may be the main battery of the electric vehicle.

According to one embodiment of the disclose, an SRM includes an inverter circuit for one phase of the SRM. The windings of the inverter circuit may be selectively supplied current. Different switch arrangements may be provided to allow greater control of the inverter windings compared to conventional SRM inverter circuits. This innovative arrangement allows the motor to operate at higher torque and speed.

Figure 1A:
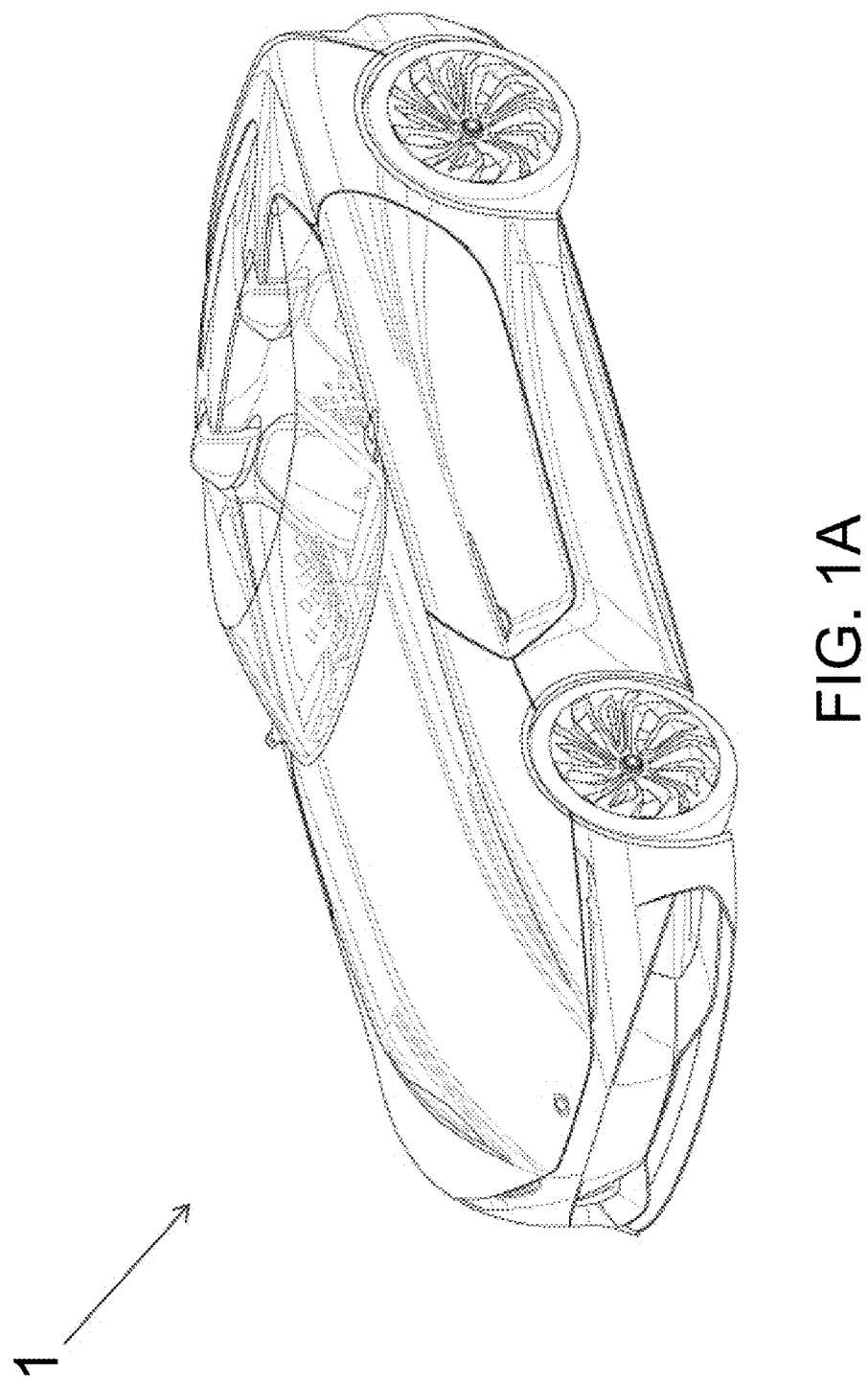
FIG. 1A is an electric vehicle with an SRM.

FIG. 1A shows an exemplary electric vehicle 1 configured to be driven by a propulsion motor(s). The propulsion motor is powered by a main battery (not shown). The motor may be an SRM that drives the wheels of the electric vehicle 1. The SRM of the vehicle may be a 3 phase SRM with a 6/4 configuration, (i.e. 6 stators and 4 rotors, see FIG. 4), however other multiphase configurations such as 6/6, 8/6, 12/8, single phase configurations such as 6/6, or any other configuration allowing magnetic reluctance to produce torque via the motor, windings, and main battery.

Figure 1B:
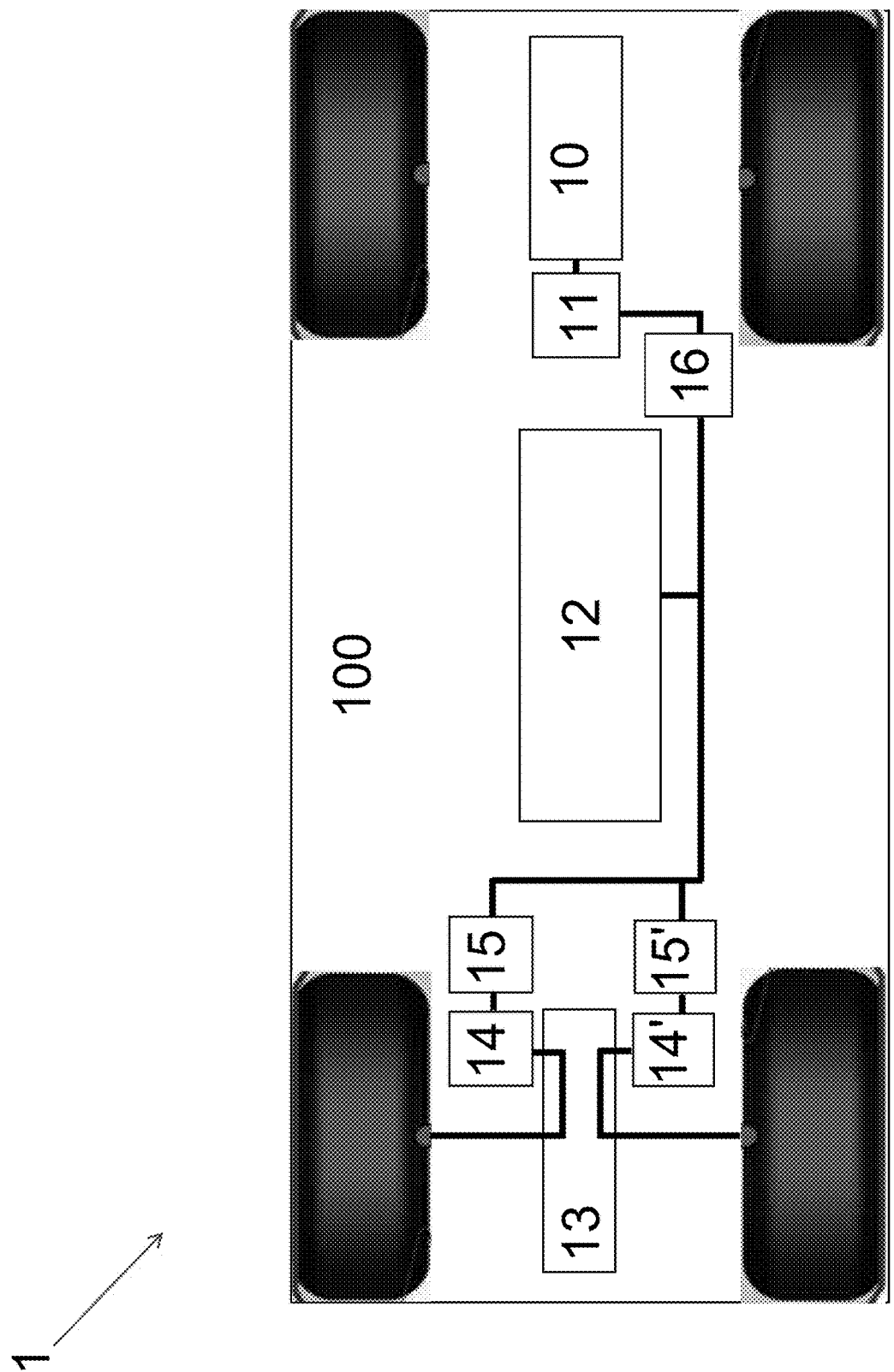
FIG. 1B is an electric vehicle with an exemplary drivetrain and with an SRM.

FIG. 1B shows an electric vehicle 1 with the drivetrain 100, the exemplary vehicle includes an internal combustion engine 10, a generator 11, and SRM 14/14'. The internal combustion engine 10 drives the generator 11 to produce electrical power for a battery 12 and the motors 14/14'. A generator inverter 16 for the generator 11 may also be provided. A gearbox 13 is provided to provide the required drive ratio for the vehicle. Power to the motor is communicated via inverters 15/15', which transforms DC power provided to the AC power required by the SRM 14/14'. The inverters 15/15' may include multiple phases corresponding to each phase of the motors 14/14'.

Figure 2:
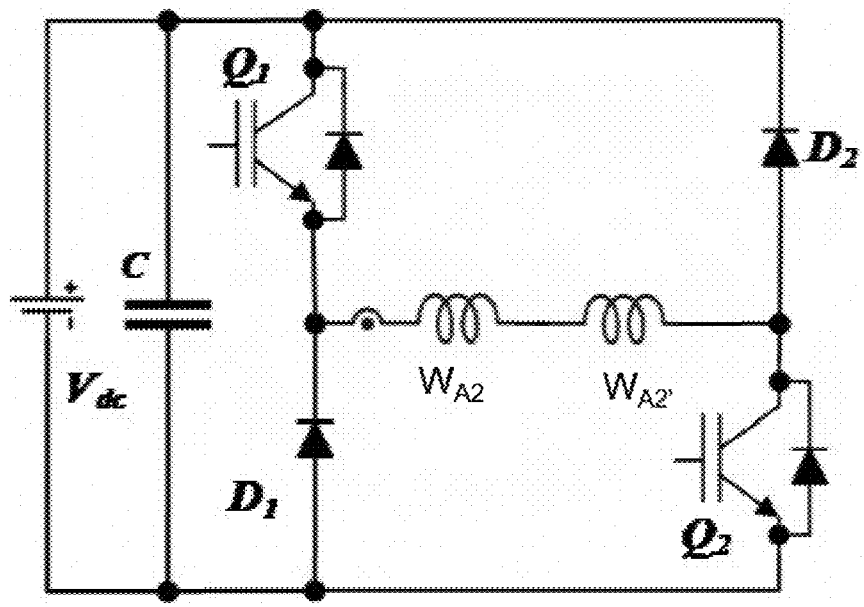
FIG. 2 a circuit diagram for single phase of a conventional SRM.
Figure 3:
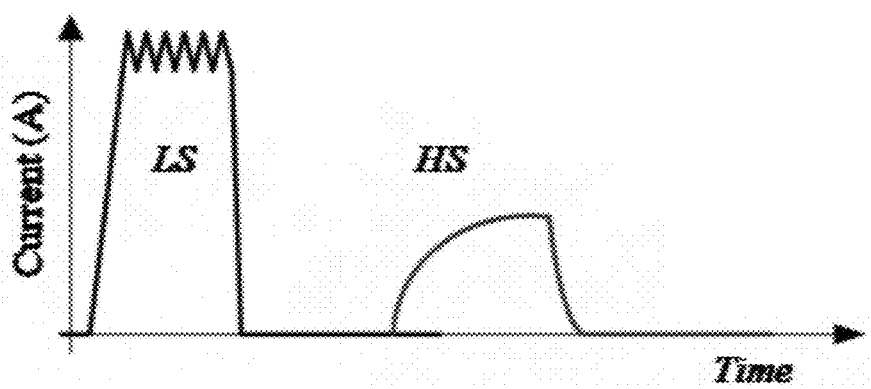
FIG. 3 is a current waveform for the SRM in a low speed and high speed range.

FIG. 2 shows a conventional inverter circuit for one phase of the SRM. Current conventional inverter circuits do not provide additional switching to the phase windings $W_{A2}$ and $W_{A2'}$. Typical wave forms for SRMs at low speed (LS) and high speed (HS) is shown in FIG. 3. At low speeds the current is controlled via pulse-width modulation and high speeds a one pulse control is used. The inverter shown in FIG. 2 includes two transistors $Q_1/Q_2$, two power diodes $D_1/D_2$, a capacitor, and a DC supply $V_{DC}$. The inverter transforms the DC supply into AC to be utilized for the motor.

Figure 4:
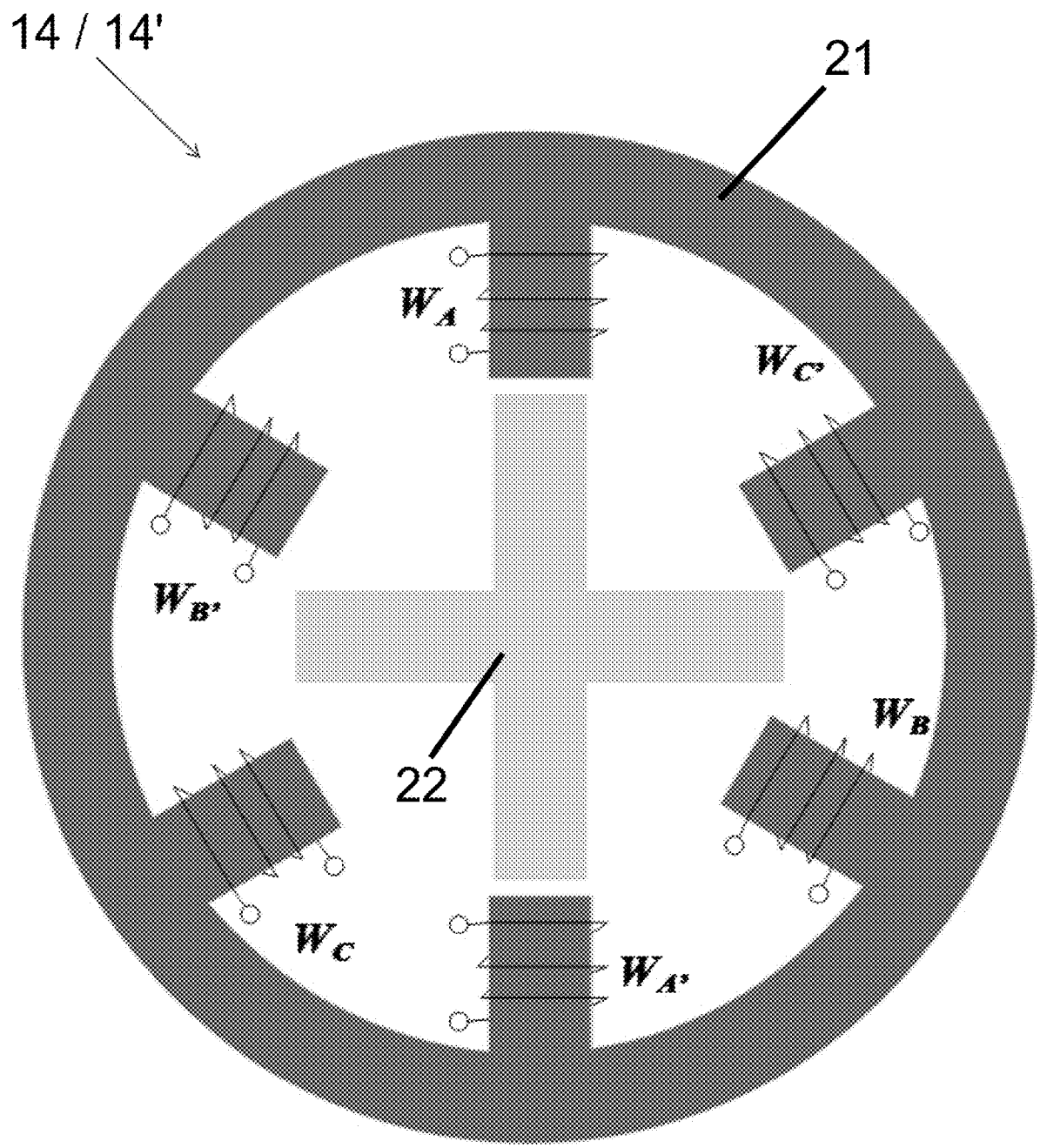
FIG. 4 is an exemplary SRM motor.

FIG. 4 illustrates the exemplary motor 14/14' as a 3-phase 6/4 SRM with windings $W_A/W_{A'}$ of a single phase A are shown to be diametrically opposite. The rotor 22 is radially inwards relative to the surrounding stator 21. Additional phases B and C may include their own windings $W_B/W_{B'}$ and $W_C/W_{C'}$ which are also diametrically opposite from each other. An angular position sensor (not shown) for the rotor may also be provided to aid in the control of the motor.

Figure 5:
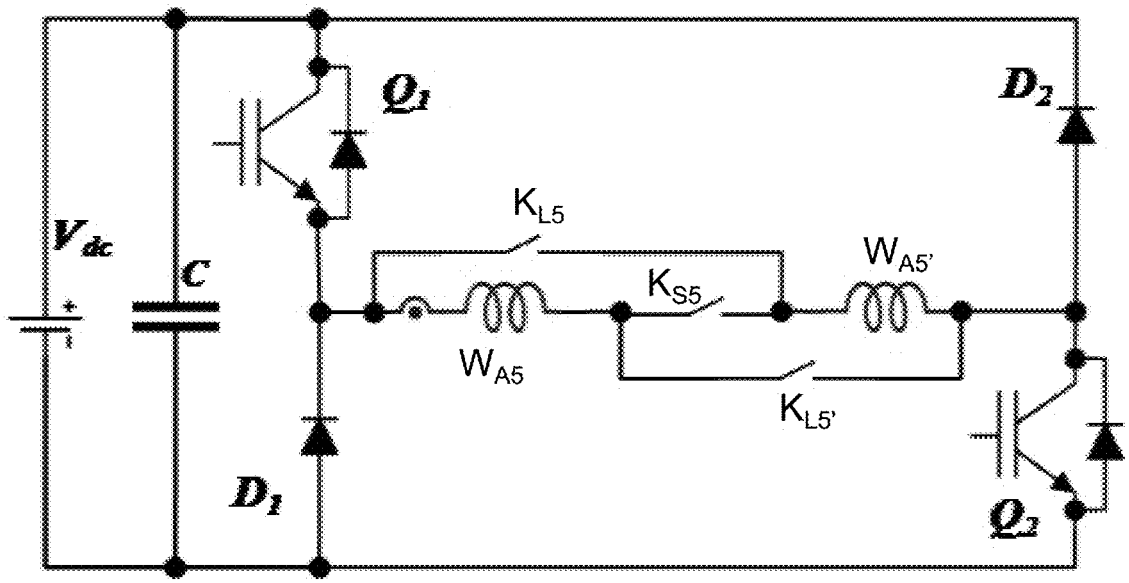
FIG. 5 is an embodiment of the switchable winding circuit for a single phase of the SRM.

FIG. 5 illustrates an exemplary inverter circuit of an SRM of an electric vehicle. As shown, windings $W_{A5}$ and $W_{A5'}$ are provided with a selective serial/parallel configuration. Windings $W_{A5}$ and $W_{A5'}$ may be switched into series via the $K_{S5}$ switch. The serial switch $K_{S5}$ allows the windings $W_{A5}$ and $W_{A5'}$ to be configured in a series connection. Thus, the windings $W_{A5}$ and $W_{A5'}$ are connected along a single path, so that the same current flows through both switches. Switches $K_{L5}$ and $K_{L5'}$ are also provided to allow windings $W_{A5}$ and $W_{A5'}$ to be configured in a parallel connection. As a result, the windings $W_{A5}$ and $W_{A5'}$ are along different paths such that current is split so that the same voltage flows through both switches. When the motor operates at low speed the circuit operates in the serial configuration, $K_{S5}$ is closed (i.e. current allowed to pass) and $K_{L5}$ and $K_{L5'}$ is open (i.e. current not allowed to pass). The serial configuration allows the motor to operate at maximum torque. As the motor speed is increased the motor switches to the parallel configuration at a predetermined motor RPM value. The predetermined value may be Maximum Rotations per Second ($MAX_{RPS}$) of the motor in the present inductance rating or any value under $MAX_{RPS}$ to form the desired profile for the SRM behavior at different speeds. The SRM behavior may include desired torque or power curves tailored to different vehicles or objectives required for the SRM. During the parallel configuration, the parallel switches $K_{L5}$ and $K_{L5'}$ are closed and the serial switch $K_{S5}$ opens. In the parallel configuration, the winding inductance of the SRM becomes 25% of the serial configuration. The lower inductance allows the inverter to drive the motor to higher speeds. Maximum speed of the motor or Maximum Rotations per Second $V/2LI_{max}*sprMAX_{RPS}$ is related to the dc bus voltage, and inductance characteristics.

The serial switch $K_{S5}$ is required to have a current rating to be the same as the inverter output current rating while the parallel switches $K_{L5}$ and $K_{L5'}$ are required to have current rating half of the inverter output current rating. In this parallel/series configuration, the windings $W_A$ and $W_B$ are required to be identical in its number of turns. The switches $K_{S5}$, $K_{L5}$ and $K_{L5'}$ may be unidirectional.

Figure 6:
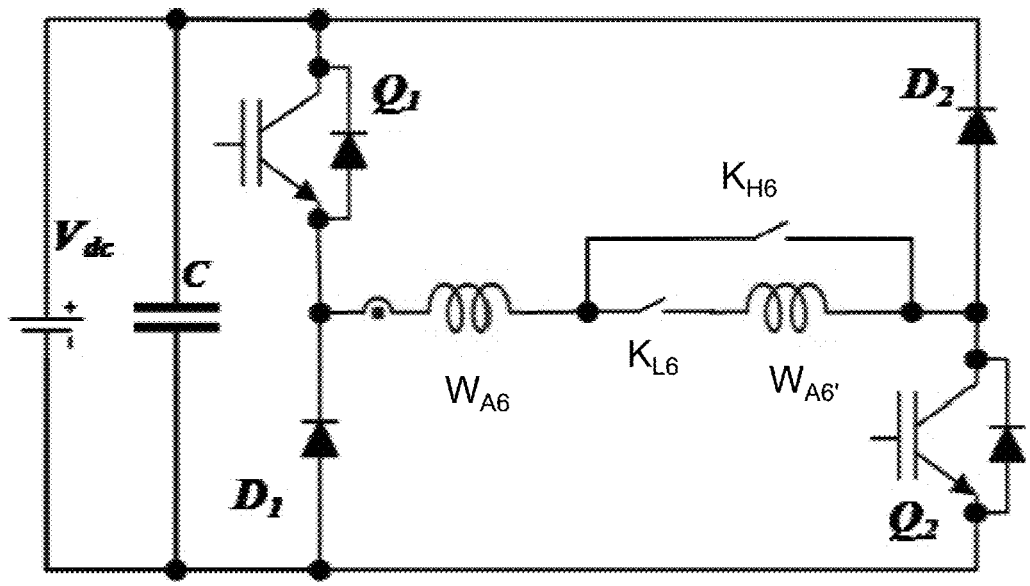
FIG. 6 is another embodiment of the switchable winding circuit for a single phase of the SRM.

FIG. 6 illustrates another embodiment where windings $W_{A6}$ and $W_{A6'}$ may be different windings of different turn ratios. In the exemplary inverter circuit of an SRM shown in FIG. 6, a serial switch $K_{L6}$ and bypass switch $K_{H6}$ are provided. The serial switch $K_{L6}$ is located in series connection with $W_{A6}$ and $W_{A6'}$. The bypass switch $K_{H6}$ is located on a circuit line parallel to $W_{A6'}$. A high speed mode may also be provided. $K_{L6}$ and $K_{H6}$ are disposed such that, in the high speed mode, the opening of switch $K_{L6}$ while maintaining $K_{H6}$ closed allows current to pass through winding $W_{A6}$ but not through $W_{A6'}$. The configuration shown in FIG. 6 reduces the motor winding's inductance and back-EMF (the electromotive force caused by self-induction of a phase) which allows for higher speeds when the motor reaches a predetermined motor RPM value. The predetermined value may be Maximum Rotations per Second ($MAX_{RPS}$) of the motor in the present inductance rating or any value under $MAX_{RPS}$ to form the desired profile for the SRM behavior at different speeds. The SRM behavior may include desired torque or power curves tailored to different vehicles or objectives required for the SRM. Also, the configuration shown in FIG. 6 allows winding $W_{A6'}$ to be of any number turn desired. The greater the number of turns in a coil, the greater the inductance. For example, the motor's behavior may be tuned by changing the turn ratio of $W_{A6'}$ as needed.

Figure 7:
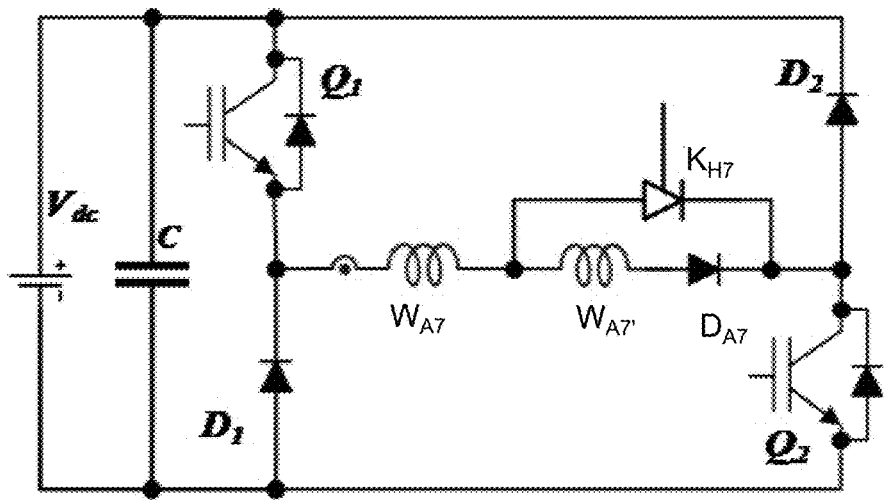
FIG. 7 is another embodiment of the switchable winding circuit for a single phase of the SRM.

FIG. 7 illustrates another embodiment utilizing one uni-directional power switch $K_{H7}$ and a power diode $D_{A7}$. Power diode $D_{A7}$ is in series connection to the windings $W_{A7}$ and $W_{A7'}$. Power switch $K_{H7}$ is parallel to the winding $W_{A7'}$ and power diode $D_{A7}$. The configuration shown in FIG. 7, allows the inverter to provide a low speed range and a high speed range. A silicon controlled rectifier (SCR) may be utilized for the uni-directional power switch but other switches based on semi-conductors may also be considered. At the low speed range, switch $K_{H7}$ is open. As the motor speeds up, switch $K_{H7}$ may close to bypass winding $W_{A7'}$ to reduce winding inductance and back-EMF to enable the motor to rotate at higher speeds. The winding cut-off ratio f may be between 0 and 1. The winding cut-off ratio is defined as the ratio of the second winding turns $T_{WA7'}$ to the total winding turns of the phase ($T_{WA7}+T_{WA7'}$). Thus $$0 < \frac{T_{WA7'}}{T_{WA7} + T_{WA7'}} < 1$$

Figure 8:
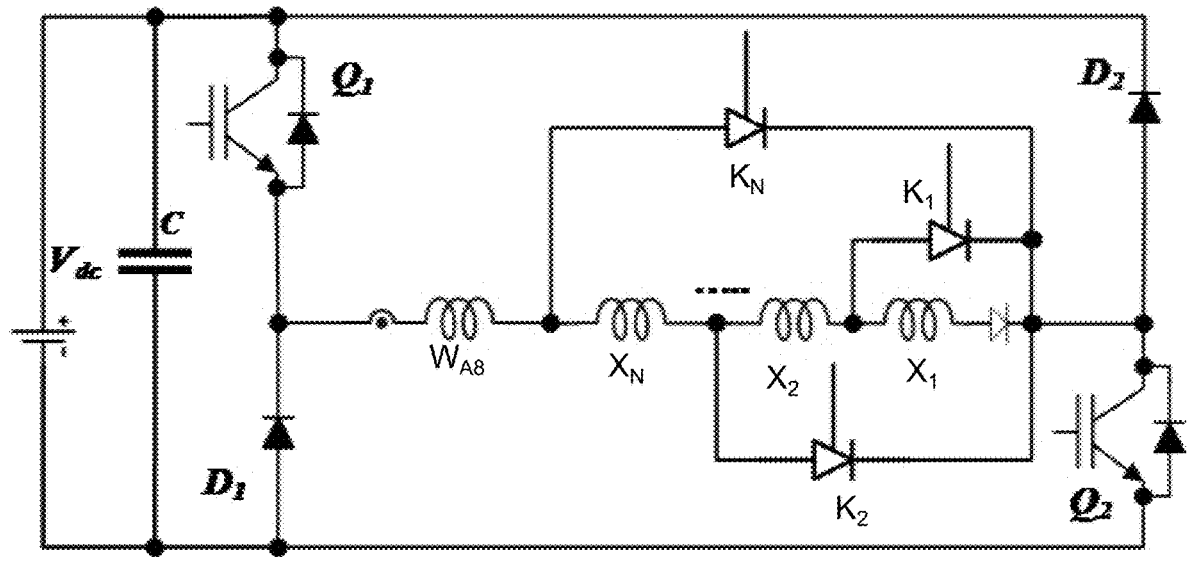
FIG. 8 is another embodiment of the switchable winding circuit for a single phase of the SRM.

FIG. 8 illustrates another embodiment utilizing multiple speed ranges to allow refinement of control of the SRM. The provision of multiple speed ranges allows the SRM to have a higher top speed due to having greater range of control of the inductance in the motor. The circuit may have any number of N switches $K_N$ with corresponding N number of supplementary windings $X_N$ and in addition to primary winding $W_{A8}$. One diode $D_{A8}$ is also needed to allow current to flow in one direction. The current ratings of each switch $K_N$ may be determined by the maximum current running through at the speed range the switch $K_N$ corresponds to. Adding additional windings and corresponding switches allows finer tuning of the motor behavior at different speeds.

The SRM described in the embodiments above may include multiple inverter circuits described in any of the embodiments that control different phases of the SRM. The same phase may be disposed in different stators of a stator/rotor stack, that is a stacked stator may be used with any embodiment described above. With different stators, torque generated should be balanced to ensure the rotor rotates efficiently without any damage due to torque differentials along the shaft at any modes.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the inverter circuit for an SRM as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An inverter circuit for a phase of a switched reluctance motor (SRM), the inverter circuit comprising:
   a plurality of transistors;
   a plurality of diodes, wherein the plurality of transistors is electrically coupled to the diode to convert a direct current (DC) supply to alternating current (AC);
   a plurality of switches configured to open and close in order to selectively run current through at least one of the plurality of windings;
   a plurality of windings configured to magnetize the stator of the SRM when at least one of the plurality switches is closed;
   wherein the inverter circuit further comprises a high-speed mode and a low speed mode;
   wherein an inductance of the inverter circuit during the high-speed mode is lower than an inductance of the low speed mode; and
   wherein the current runs through only one winding of the plurality of windings during the high speed mode.

2. The inverter circuit of claim 1, wherein the plurality of windings is disposed about a stator of the SRM.

3. The inverter circuit of claim 1, wherein at least two switches of the plurality of switches are in parallel connection to each other.

4. The inverter circuit of claim 1, wherein at least one switch of the plurality of switches is in series connection with the plurality of windings.

5. The inverter circuit of claim 1, wherein each winding of the plurality of windings are identical to each other.

6. The inverter circuit of claim 1, wherein at least one winding of the plurality of windings has a different number of turns.

7. A switched reluctance motor (SRM) comprising:
   a plurality of phases;
   an inverter circuit configured to control a phase of the plurality of phases, the inverter circuit comprising:
      a plurality of switches configured to open and close in order to selectively run current through at least one of the plurality of windings;
      a plurality of windings configured to magnetize the stator of the SRM when at least one the plurality switches are closed;
   wherein the inverter circuit further comprises a high-speed mode and a low speed mode
   wherein an inductance of the inverter circuit during the high-speed mode is lower than an inductance of the low speed mode; and
   wherein the current runs through only one winding of the plurality of windings during the high-speed mode.

8. The SRM of claim 7, wherein the plurality of windings is disposed about a stator of the SRM.

9. The SRM of claim 7, wherein at least two switches of the plurality of switches are in parallel connection to each other.

10. The SRM of claim 7, wherein at least one switch of the plurality of switches is in series connection with the plurality of windings.

11. The SRM of claim 7, wherein each winding of the plurality of windings are identical to each other.

12. The SRM of claim 7, wherein at least one winding of the plurality of windings has a different number of turns.

13. The SRM of claim 7, wherein other phases of the plurality of phases are also controlled by a corresponding inverter circuit.

14. An electric vehicle comprising:
   a switched reluctance motor (SRM) comprising:
      a rotor;
      a stator;
      a plurality of phases corresponding to a number of stator pairs;
   wherein the SRM drives a wheel of the electric vehicle;
   an inverter circuit configured to control a phase of the plurality of phases, the inverter circuit comprising:
      a plurality of switches configured to open and close in order to selectively run current through at least one of the plurality of windings;
      a plurality of windings surrounding the stator of the SRM configured to magnetize the stator of the SRM when at least one the plurality switches are closed
   wherein the inverter circuit includes a plurality of speed modes, and in at least one speed mode in the plurality of speed modes a wherein the current runs through only one winding of the plurality of windings during a first speed mode and wherein the current runs through all of the windings of the plurality of windings during a second speed mode; and
   the first speed mode corresponding to a faster SRM condition than the second speed mode.

15. The electric vehicle of claim 14, the inductance of the inverter circuit during the high speed mode is lower than the inductance of the low speed mode.

16. The electric vehicle of claim 14, wherein other phases of the plurality of phases are also controlled by a corresponding inverter circuit.

* * * * *